United States Patent [19]

Obara

[11] Patent Number: 4,833,290
[45] Date of Patent: May 23, 1989

[54] ELECTRIC DISCHARGE WIRE CUTTING CONDITIONS VARIED WITH NOZZLE HEIGHT AND LIQUID PRESSURE

[75] Inventor: Haruki Obara, Sagamihara, Japan
[73] Assignee: Fanuc Ltd, Minamitsuru, Japan
[21] Appl. No.: 186,486
[22] PCT Filed: Aug. 12, 1987
[86] PCT No.: PCT/JP87/00606
 § 371 Date: Mar. 28, 1988
 § 102(e) Date: Mar. 28, 1988
[87] PCT Pub. No.: WO88/01216
 PCT Pub. Date: Feb. 25, 1988

[30] Foreign Application Priority Data

Aug. 18, 1986 [JP] Japan .................. 61-192530

[51] Int. Cl.⁴ .................. B23H 7/02; B23H 7/04
[52] U.S. Cl. .................. 219/69.12; 219/69.14; 219/69.17
[58] Field of Search .......... 219/69 D, 69 W, 69 C, 219/69 M; 204/206, 224 M

[56] References Cited

U.S. PATENT DOCUMENTS

4,559,434 12/1985 Kinoshita .................. 219/69 W
4,709,131 11/1987 Del Bello et al. ........... 219/69 D

FOREIGN PATENT DOCUMENTS

56-76340 6/1981 Japan .
61-56826 3/1986 Japan .
164721 7/1986 Japan .

Primary Examiner—A. D. Pellinen
Assistant Examiner—Geoffrey S. Evans
Attorney, Agent, or Firm—Staas & Halsey

[57] ABSTRACT

An electric discharge apparatus in which a voltage is applied between a workpiece and a wire and a machining liquid is supplied into a gap between the workpiece and the wire for machining the workpiece. When a nozzle cannot be located closely to the surface of the workpiece, a nozzle liquid pressure is calculated from the nozzle height, and reference machining conditions are varied by the nozzle liquid pressure, so that optimum machining conditions can automatically be determined. Machining conditions (the Material M, the workpiece thickness t, the wire diameter d) are entered from an input means (1), and reference machining conditions (Vo, Ton0, Toff0) from a machining condition storing means (3) for the electric discharge wire cutting apparatus are selected. Nozzle liquid pressures (Pu, Pl) are calculated by a calculating means (2) from nozzle heights (u, 1) entered from the input means (1). In a machining condition varying means (4), machining conditions (V, Ton, Toff) obtained by varying the reference machining conditions while the nozzle liquid pressures (Pu, Pl) are given to a machining power supply (5) to machine the workpiece under the varied machining conditions.

9 Claims, 3 Drawing Sheets

ELECTRIC DISCHARGE WIRE CUTTING CONDITIONS VARIED WITH NOZZLE HEIGHT AND LIQUID PRESSURE

BACKGROUND OF THE INVENTION

1. Field of the Invention

The present invention relates to an electric discharge wire cutting apparatus, and more particularly to an electric discharge wire cutting apparatus capable of automatically varying machining conditions dependent on the position of nozzles.

2. Description of the Related Art

It is widely known in the field of electric discharge wire cutting that the pressures of a machining liquid from nozzles are increased to cool the wire and to accelerate removal of machining chips, thereby increasing the machining rate. To this end, the nozzles are required to be located as closely to the workpiece as possible. One example of such an arrangement is disclosed in Japanese Utility Model Publication No. 52-123794.

FIG. 4 schematically shows the relationship between a workpiece and nozzles. A table 11 places a workpiece 12 between upper and lower nozzles 13 and 14, respectively. A machining liquid is poured from the upper and lower nozzles 13 and 14 into a machined hole (not shown) in the workpiece 12. The closer the nozzles are to the workpiece, the higher the pressure of the machining liquid, so that the workpiece can be machined at a higher speed under stricter conditions.

When a subtable 15 is used, as shown in FIG. 5, during a machining process, the lower nozzle 14 needs to be spaced a certain distance from the workpiece since the subtable 15 and the nozzle 14 would otherwise interfere with each other.

Moreover, as shown in FIG. 6, where a stack of thin workpieces are machined, the stacked workpieces 16 should be spaced a distance from the lower nozzle 14 because a workpiece holding screw 17 which holds the workpieces together would interfere with the lower nozzle 14. Therefore, the workpiece or workpieces may not be machined while the nozzles are being located closely to the workpiece or workpieces.

Machining conditions are generally determined while the nozzles are disposed closely to the workpiece as shown in FIG. 4. If the nozzles are spaced from the workpiece, the workpiece cannot properly be machined under normal machining conditions, and the wire may be broken or the machining accuracy may be lowered.

There is also a device for varying the rate of flow of a machining liquid dependent on the position of the nozzles. However, this device has not necessarily been useful since a considerable degree of skill is required on the part of the operator to determine an appropriate flow rate for the machining liquid.

SUMMARY OF THE INVENTION

It is an object of the present invention to provide a control for an electric discharge wire cutting apparatus which will solve the aforesaid problems and is capable of automatically varying machining conditions dependent on the position of nozzles.

To solve the above problems, according to the present invention, there is provided a control for an electric discharge wire cutting apparatus for applying a voltage between a workpiece and a wire to machine the workpiece while supplying a machining liquid to a gap between the workpiece and the wire. The electric discharge wire cutting apparatus includes input means for entering machining data including nozzle height, calculating means for calculating a nozzle liquid pressure from a nozzle height entered by the input means, machining condition storing means for storing reference machining conditions, and machining condition varying means for varying the machining conditions from the machining condition storing means with the nozzle liquid pressure from the calculating means whereby the machining conditions are automatically varied dependent on the nozzle height.

The nozzle height and the liquid pressure exerted on a workpiece surface are related such that as the nozzle height increases, the liquid pressure is lowered.

The liquid pressure and the machining speed are related such that as the liquid pressure increases, the machining speed increases. Therefore, as the nozzle height increases, it is necessary to reduce the machining speed. Consequently, the nozzle height is entered as data and the reference machining conditions are varied dependent on the nozzle height. The workpiece is thus machined in a stable manner under the machining conditions according to the liquid pressure.

DETAILED DESCRIPTION OF THE PREFERRED EMBODIMENT

A preferred embodiment of the present invention will hereinafter be described in specific detail with reference to the drawings.

Figure 1:
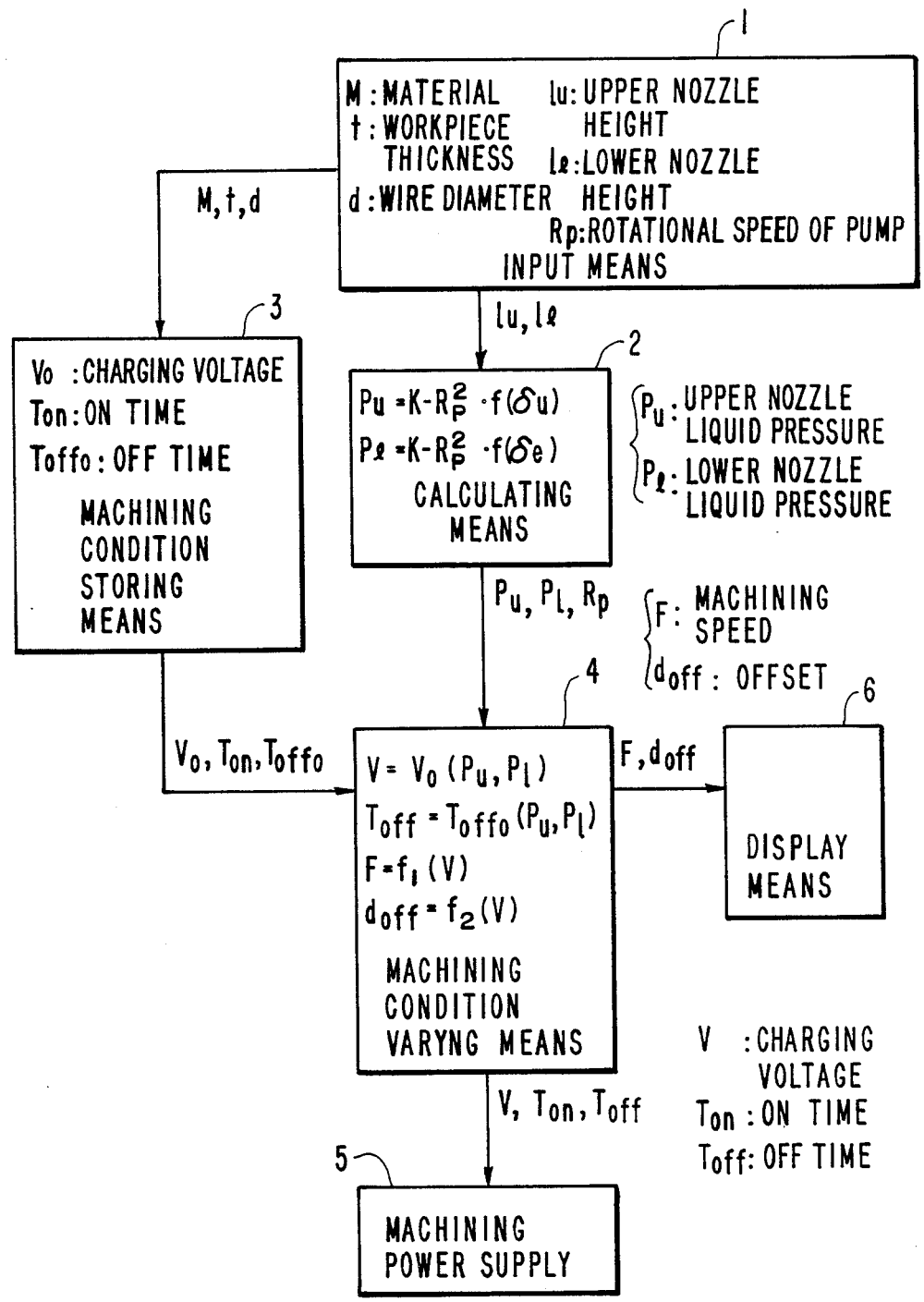
FIG. 1 is a block diagram of a first preferred embodiment of the present invention.

FIG. 1 is a block diagram of an embodiment of a electric discharge wire cutting apparatus which includes input means 1 which normally comprises a keyboard, calculating means 2 for calculating a nozzle liquid pressure and outputting the calculated nozzle liquid pressure to a machining condition varying means (described later), and machining condition storing means 3 for storing normal machining condition data. A machining condition varying means 4 varies the machining condition data from the machining condition storing means 3 based on the liquid pressure from the calculating means 2 and outputs applying new machining conditions to a machining power supply 5 which effects machining operation under the given machining conditions. a display means 6 displays various input data, predictive data, alarm messages, and the like.

Operation of the embodiment will hereinafter be described. When nozzles are located closely to a workpiece, data items such as
  M: material
  t: workpiece thickness
  d: wire diameter are entered by the input means 1 in order to determine machining conditions. When the nozzles are separated from the workpiece, data items such as $l_u$: upper nozzle height
$l_1$: lower nozzle height
Rp: rotational speed of the pump are also entered.

The data items such as the material (M), the workpiece thickness (t), the wire diameter (d), and the like are sent to the machining condition storing means 3, and normal machining conditions, i.e., machining conditions where the nozzles are disposed closely to the workpiece are determined: The machining conditions include:

Vo: charging voltage
Ton: ON time
Toff: OFF time
C: capacitance of the capacitor
Ip: charging current
Vs: servo voltage
T: tension and these data items are delivered to the machining condition varying means 4.

The data items of $l_u$, $l_1$, Rp are fed to the calculating means 2 where the liquid pressures are calculated. The liquid pressures can be determined by:

$$Pu = K \cdot Rp^2 \cdot f(\delta u)$$

$$Pl = K \cdot Rp^2 \cdot f(\delta l).$$

The symbols used are defined as follows:
Pu: upper nozzle liquid pressure
Pl: lower nozzle liquid pressure
K: constant
Rp: rotational speed of the pump
$\delta_u$: upper nozzle height
$\delta_1$: lower nozzle height.

Figure 2:
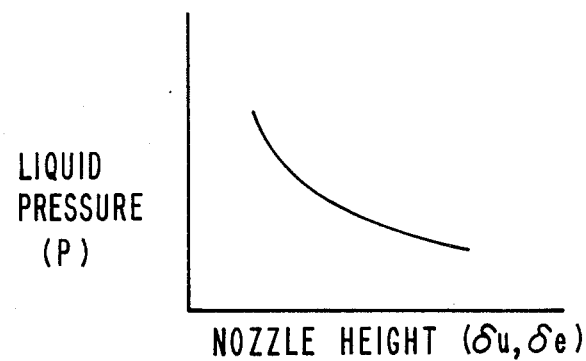
FIG. 2 is a graph showing the relationship between nozzle height and liquid pressure.
Figure 3:
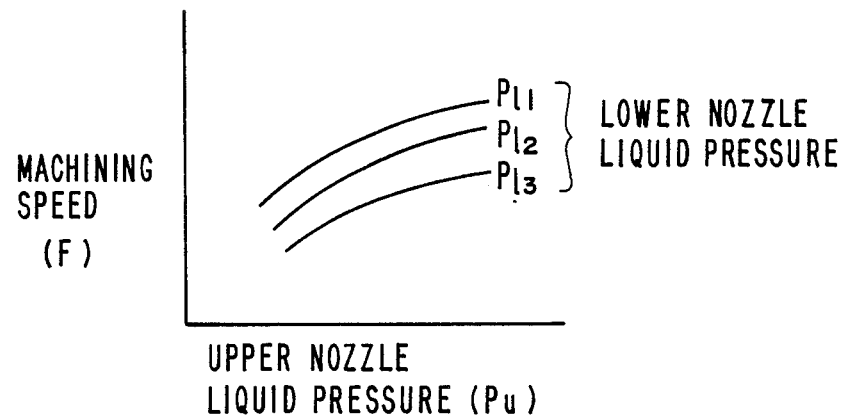
FIG. 3 is a graph showing the relationship between nozzle liquid pressure and machining speed.
Figure 4:
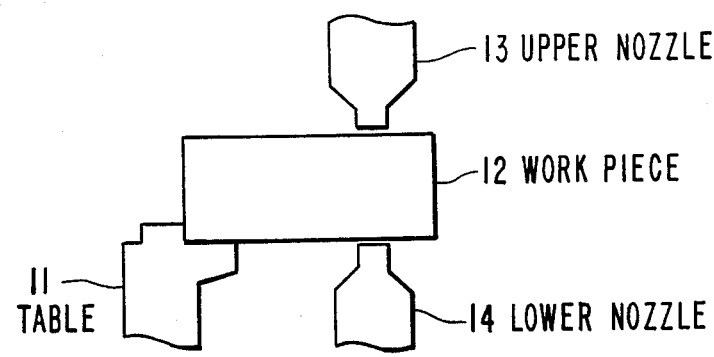
FIG. 4 is a schematic view of a machining apparatus in which nozzles are located closely to a workpiece.
Figure 5:
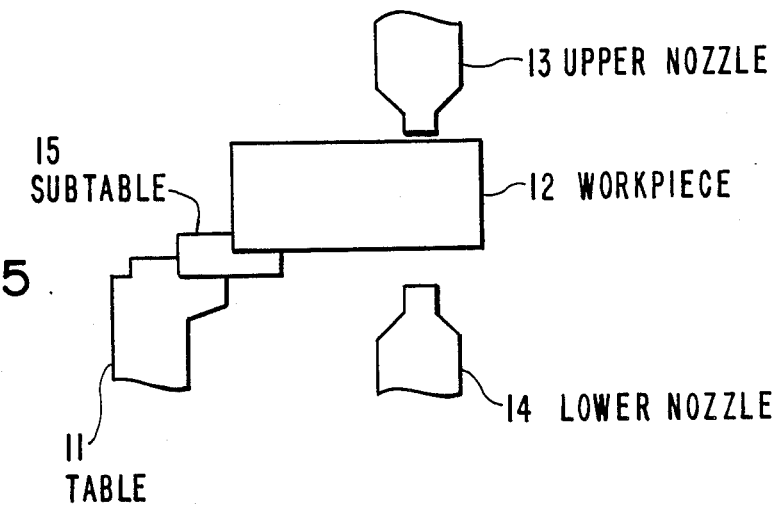
FIG. 5 is a schematic view of a machining apparatus similar to the apparatus of FIG. 4 in which a subtable is employed.
Figure 6:
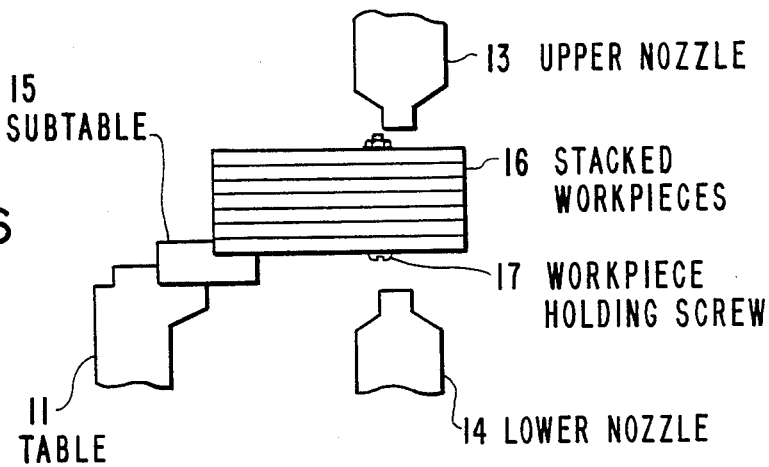
FIG. 6 is a schematic view of a machining apparatus similar to the apparatus of FIG. 5 process in which stacked workpieces are machined.

$f(\delta_u)$, $f(\delta_1)$ are functions indicating the relationship between the nozzle heights and the liquid pressures as shown in FIG. 2. The liquid pressures thus determined are sent to the machining condition varying means 4.

The machining condition varying means 4 modifies or varies the delivered reference machining conditions with the liquid pressures. Which conditions are to be varied is dependent on the workpiece, the conditions, the speed, and the like. The capacitor capacitance is not generally varied since it greatly affects the surface roughness. When the nozzle heights are varied, the liquid pressures are lowered. When the machining conditions are varied, one of the great problems caused is breakage of the wire. The phenomenon of wire breakage is largely affected by the charging voltage (V), the OFF time (Toff), the charging current (Ip), and the like.

For example, assuming that the reference OFF time stored in the machining condition storing means 3 is Toff0, an optimum OFF time Toff when the nozzles are separated from the workpiece and the liquid pressure is lowered can be expressed by:

$$Toff = Toff0 \cdot \{(Po/Pu) \cdot (Po/Pl)\}^m$$

where Po is the liquid pressure at the time the nozzle is in intimate contact with the workpiece, and m a coefficient that is experimentally determined.

The actual OFF time is determined according to the above equation in the machining condition varying means 4. The determined OFF time is applied to the machining power supply for machining the workpiece with the modified OFF time. Rather than relying upon the calculation according to the equation, an optimum OFF time may be determined experimentally, and a table with respect to nozzle heights is prepared and stored in the machining condition storing means, so that an optimum OFF time may be read out of the table when a nozzle height is entered. The upper nozzle 13 only, the lower nozzle 14 only, or both of the upper and lower nozzles may be simultaneously be considered.

Thus, even when the nozzles are separated from the workpiece, the workpiece can be machined automatically under optimum machining conditions.

While the OFF time has been described in the above embodiment, the charging voltage or the charging current may also be varied in the same manner.

These data items may be varied by preparing pre-calculated tables and reading corresponding data from the tables when nozzles heights are given.

Based on the varied machining conditions, data items such as a machining time, an offset, and the like under these machining conditions can be displayed on a display means which is normally a CRT or the like.

A machining condition may be set and entered by the operator during machining operation. In this case, if the entered condition is stricter than the automatically determined condition, e.g., if the charging voltage is higher, the wire is subjected to the danger of breakage. Therefore, should this happen, an alarm message is displayed on the display means 6.

As the nozzles are separated from the workpiece, the liquid pressures are lowered, as shown in FIG. 2, and hence the maximum workpiece thickness that can be machined without wire breakage is also reduced. The maximum machinable workpiece thickness may therefore be experimentally determined, and when the nozzle heights exceed the maximum machinable workpiece thickness based on the data of the workpiece thickness and the nozzle heights that have been entered from the input means, an alarm may be issued and an alarm message may be displayed on the display means 6.

The aforesaid control is executed by a microprocessor in the electric discharge wire cutting apparatus, and various data items are stored in a memory such as a RAM or the like. The mechanism of the electric discharge wire cutting apparatus may be of a conventional nature.

With the present invention, as described above, inasmuch as the machining conditions are automatically varied dependent on the nozzle heights, the workpiece can be stably machined by entering nozzle height data even if the nozzles cannot be located closely to the workpiece.

I claim:

1. An electric discharge wire cutting apparatus which applies a voltage between a workpiece and a wire to machine the workpiece while supplying a machining liquid through nozzles to a gap between the workpiece and the wire, the electric discharge wire cutting apparatus comprising:

input means for entering data determinative of machining conditions and for entering nozzle height;

calculating means for calculating a nozzle liquid pressure in accordance with nozzle height entered from the input means;

machining condition storing means for storing and outputting reference machining conditions determined by data input from the input means; and machining condition varying means for varying the machining conditions input from the machining condition storing means in accordance with the nozzle liquid pressure calculated by the calculating means;

the machining conditions being automatically varied dependent on the nozzle height.

2. An electric discharge wire cutting apparatus according to claim 1, wherein the machining conditions to be varied by said machining condition varying means include at least an OFF time.

3. An electric discharge wire cutting apparatus according to claim 1, wherein the machining conditions to be varied by said machining condition varying means include at least a charging voltage.

4. An electric discharge wire cutting apparatus according to claim 1, wherein said machining condition varying means has a stored table of nozzle heights, so that data corresponding to a nozzle height entered through the input means is read from said table.

5. An electric discharge wire cutting apparatus according to claim 1, further including display means for displaying predictive data based on the machining conditions varied by said machining condition varying means.

6. An electric discharge wire cutting apparatus according to claim 1, further including data storing means for storing the machining conditions varied by said machining condition vary means, and comparing means for comparing the data stored in the data storing means and machining conditions newly entered from the input means, and an alarm triggered when machining conditions stricter than the varied machining conditions are entered from said input means.

7. An electric discharge wire cutting apparatus according to claim 1, wherein a maximum machining workpiece thickness corresponding to the nozzle height is stored in said machining condition storing means, and an alarm is displayed when the nozzle height and a workpiece thickness greater than the workpiece thickness corresponding to the nozzle height are entered from said input means.

8. A controller for an electric discharge wire cutting apparatus which applies a voltage between a workpiece and a wire to machine the workpiece while supplying a machining liquid through nozzles to a gap between the workpiece and the wire, the controller comprising:

input means for entering data determinative of machining conditions and for entering nozzle height;

calculating means for calculating a nozzle liquid pressure in accordance with nozzle height entered from the input means;

machining condition storing means for storing and outputting reference machining conditions determined by data input from the input means; and machining condition varying means for varying the machining conditions input from the machining condition storing means in accordance with the nozzle liquid pressure calculated by the calculating means;

the machining conditions being automatically varied dependent on the nozzle height.

9. A method of maintaining optimum machining conditions in an electric discharge wire cutting apparatus in which a voltage is applied between a workpiece and a wire and nozzles supply machining liquid to a gap between the workpiece and the wire, the method comprising:

calculating nozzle liquid pressure in accordance with nozzle height relative to the workpiece;

varying reference machining conditions in accordance with variances in the nozzle liquid pressure; and machining the workpiece according to the varied machining conditions.

* * * * *